A. MÜNTZING.
APPARATUS FOR SEPARATING SOLID MATTERS FROM LIQUIDS.
APPLICATION FILED JUNE 6, 1911.
1,048,853.   Patented Dec. 31, 1912.
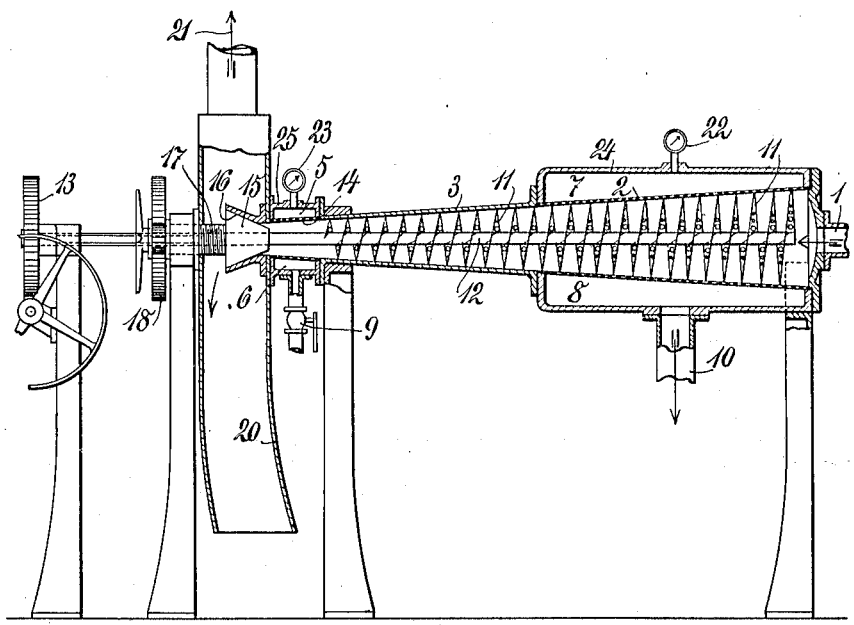

UNITED STATES PATENT OFFICE.

ALVAR MÜNTZING, OF STOCKHOLM, SWEDEN.

APPARATUS FOR SEPARATING SOLID MATTERS FROM LIQUIDS.

1,048,853.   Specification of Letters Patent.   Patented Dec. 31, 1912.

Application filed June 6, 1911. Serial No. 631,515.

*To all whom it may concern:*

Be it known that I, ALVAR MÜNTZING, a subject of the King of Sweden, and resident of V. Trädgårdsgatan 11 B, Stockholm, in the Kingdom of Sweden, have invented certain new and useful Improvements in Apparatus for Separating Solid Matters from Liquids, of which the following is a specification, reference being had therein to the accompanying drawing.

This invention relates to apparatus for continually separating solid, especially fibrous matters from a liquid in which they are suspended and which is contained under pressure in a closed vessel (for instance a boiler for cellulose) without the pressure being neutralized or reduced.

The apparatus is illustrated in longitudinal section in the accompanying drawing.

The mixture of liquid and solid matters is forced from the vessel (for instance a boiler for cellulose under pressure), containing the mixture, into the apparatus through a pipe 1. The mixture enters into the wider end 2 of a somewhat conical drum, which end is arranged like a strainer. The said drum must be manufactured of a metal, adapted to the nature of the liquid. The said part 2 of the drum is provided with holes of the proper size and located around the whole periphery of the drum. The liquid is then forced out from the drum through the said holes by the pressure existing in the mixture, while the solid matters remain in the drum. The liquid freed from the solid matters passes into a chamber 7, 8, formed by a mantle 24 located around the part 2 of the drum, which mantle is so constructed, that it can sustain the pressure in question. The said liquid is conducted under pressure through a pipe 10 and by means of a pump (not shown) or the like to the vessel (boiler), containing the mixture, in order to compensate for a reduction of the pressure, which may possibly be effected, and cause the liquid to circulate. The solid matters are gradually accumulated in the part 2 of the drum and are forced forward in the same from its inlet end by means of a feed device, for instance a screw-shaped wing 11 fixed to a shaft 12, which is rotated at a suitable rate by a motor by means of a motion transmitting device 13. The part of the wing 11 located in the strainer 2 is preferably perforated to facilitate the entering of the mixture into the strainer. Also the opposite end 14 of the drum is arranged like a strainer, which is inclosed by a mantle 25, forming a chamber 5, 6 around the strainer. The said chamber is provided with means for removing the solid matters, consisting in the apparatus, shown in the drawing, of a conical valve body 15, tightening against a conical casing 16. The valve 15, 16 can be opened to a greater or less extent by means of a screw spindle 17, carrying the valve body, and a gearing 18. The shaft 12 is passed through the hollow screw spindle and the valve body, so that it can be rotated independently of the same.

Between the perforated end parts of the conical drum there is an unperforated part 3, through which the feed screw 11 extends. The part of the feed screw 11 located in the unperforated part 3 of the drum does not serve exclusively to feed the material forward but its object is also to balance the pressure of the mixture entering the drum. For that purpose the feed screw must fit tightly to the unperforated part 3 of the drum. The feed screw 11 is preferably arranged to be moved longitudinally, so that, as the wing is worn, the screw can be adjusted with relation to the drum.

When the solid matters have been fed into the strainer 14 and accumulated in the same, the valve 15, 16 is opened to such an extent, that they are removed in the same degree as they are accumulated. The matters leaving the drum fall down in a drum 20 of sheet metal. Steam, which possibly escapes from the released solid matters, passes upward in the direction indicated by the arrow 21. By means of manometers 22, 23 observations of the pressure, the consistency of the accumulated solid matters and so on can be made. When solid matters have been accumulated in the unperforated part of the drum, the tightening of the screw against the said part is increased, which results in the manometer 23, indicating a very low pressure. When, on the other hand, the accumulation of the solid matters is decreased, the tightening of the screw against the unperforated part is decreased, so that the pressure of the liquid is transmitted to some extent to the chamber 5, 6, which is also indicated by the manometer 23. Inlet openings (not shown) are provided in the mantles 24, 25, through which water and steam are introduced for the cleaning of the strainer openings.

Having now described my invention, what I claim as new and desire to secure by Letters Patent is:

1. In an apparatus for continuously separating from a liquid, contained under pressure in a closed vessel, solid matters suspended therein, the combination of a conical drum, communicating with the said vessel, perforated end parts on said drum, a feed device passed through said drum and tightening against the unperforated center part of the same for balancing the pressure of the entering mixture, mantles inclosing the said perforated end parts of the drum, a conduit connecting with the said vessel the chamber formed by the mantle surrounding the entrance end of the drum, and an outlet device for the solid matters provided in the outlet end of the drum.

2. In an apparatus for continuously separating from a liquid, contained under pressure in a closed vessel, solid matters suspended therein, the combination of a conical drum, communicating with the said vessel, perforated end parts on said drum, a feed screw passed through said drum, perforations in the wings of the screw, said screw tightening against the unperforated center part of the same for balancing the pressure of the entering mixture, mantles inclosing the said perforated end parts of the drum, a conduit connecting with the said vessel the chamber formed by the mantle surrounding the entrance end of the drum, a pump located in said conduit, and an outlet device for the solid matters provided in the outlet end of the drum.

In witness whereof, I have hereunto signed my name in the presence of two subscribing witnesses.

ALVAR MÜNTZING.

Witnesses:
   HEDING MELINDER,
   AXEL EHRUER.